United States Patent
Dudar et al.

(10) Patent No.: US 11,618,373 B1
(45) Date of Patent: Apr. 4, 2023

(54) ADAPTIVE COLOR SELECTION FOR VEHICLE PUDDLE LIGHTS

(71) Applicant: FORD GLOBAL TECHNOLOGIES, LLC, Dearborn, MI (US)

(72) Inventors: Aed Dudar, Canton, MI (US); Fling Tseng, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/712,273

(22) Filed: Apr. 4, 2022

(51) Int. Cl.
    *B60Q 1/50* (2006.01)
    *B60Q 1/24* (2006.01)
    *G06T 7/521* (2017.01)
    *G06T 7/90* (2017.01)
    *G06T 7/194* (2017.01)
    *G06V 20/56* (2022.01)

(52) U.S. Cl.
    CPC .............. *B60Q 1/545* (2022.05); *B60Q 1/249* (2022.05); *G06T 7/194* (2017.01); *G06T 7/521* (2017.01); *G06T 7/90* (2017.01); *G06V 20/588* (2022.01)

(58) Field of Classification Search
    CPC ........ B60Q 1/545; B60Q 1/249; G06T 7/194; G06T 7/521; G06T 7/90; G06V 20/588
    See application file for complete search history.

(56) References Cited

U.S. PATENT DOCUMENTS

| | | | |
|---|---|---|---|
| 9,321,395 B2 | 4/2016 | Ammar et al. | |
| 10,049,512 B2 | 8/2018 | Dudar et al. | |
| 10,160,380 B1 | 12/2018 | Salter et al. | |
| 10,399,483 B2 | 9/2019 | Johnson et al. | |
| 2014/0218212 A1 | 8/2014 | Nykerk | |
| 2017/0050561 A1 | 2/2017 | Lickfelt | |
| 2017/0210282 A1* | 7/2017 | Rodriguez Barros . | G03B 21/00 |
| 2018/0004020 A1* | 1/2018 | Kunii ................... | H04N 9/3194 |
| 2020/0070716 A1 | 3/2020 | Sakata et al. | |
| 2020/0180939 A1 | 6/2020 | Dudar | |
| 2021/0229597 A1 | 7/2021 | Dellock et al. | |

* cited by examiner

*Primary Examiner* — Andrew J Coughlin
*Assistant Examiner* — Jessica M Apenteng
(74) *Attorney, Agent, or Firm* — Frank L. Lollo; MacMillan, Sobanski & Todd, LLC

(57) ABSTRACT

A puddle light system projects content-bearing images onto a ground surface adjacent a vehicle using a puddle light projector unit having a multicolor light source configured to project the content-bearing images using at least one selected color from a plurality of available colors. An image sensor directed at the ground surface and mounted on the vehicle is configured to capture colored images. A controller is configured to (A) construct one of the content-bearing images as an image representation with an illumination region to be projected onto the ground, (B) analyze a first colored image of the ground surface with the light source deactivated to identify a dominant surface color, (C) select a complementary color relative to the dominant surface color, (D) colorize the illumination region using the selected complementary color, and (E) command the puddle light projector unit to project the image representation using the colorized illumination region.

16 Claims, 5 Drawing Sheets

ADAPTIVE COLOR SELECTION FOR VEHICLE PUDDLE LIGHTS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to vehicle puddle lighting systems, and, more specifically, to projecting content-bearing images on a ground surface around a vehicle when a user is approaching the vehicle.

Vehicle exterior lighting systems may be activated when a user is in the vicinity of a vehicle to provide illumination around a vehicle door (e.g., for avoiding stepping in a puddle or tripping on an uneven surface or objects). Puddle lights are typically installed in a sideview mirror, vehicle underbody, or other exterior trim components to illuminate the ground surface. In order to provide more than just flood lighting, puddle light systems may include a light projector unit using elements such as multi-colored LED light sources, filters, lenses, and/or other optics in order to generate content-bearing images. Such images may include graphic designs (e.g., logos), graphic data (e.g., color-coded indications of vehicle status such as battery charge level or interior cabin temperature), and/or textual information (e.g., vehicle diagnostic data, fuel level warnings, or greetings).

Since the color(s), texture, or other light reflection properties of a ground surface around a vehicle can have many variations, visibility or legibility of projected images may be degraded in some situations. For example, projecting an image using a particular color of light may be difficult to discern (e.g., have low contrast) when the apparent color of the ground surface shares the same or a similar color. In other words, a projected foreground color may blend with a background color derived from the ground surface. A darker color (e.g., brown or dark blue) may have good contrast when projected onto a white cement surface but may have poor contrast when projected onto an asphalt surface. A white or light colored foreground image may be easy to see on black asphalt but difficult to see on a snowy surface or on a cement surface in the daylight. Road or parking lot surfaces may be painted various colors, and vehicles may be driven off road onto surfaces of almost any color.

SUMMARY OF THE INVENTION

In one aspect of the invention, a puddle light system projects content-bearing images onto a ground surface adjacent a vehicle. A puddle light projector unit mounted on the vehicle comprises a multicolor light source configured to project the content-bearing images using at least one selected color from a plurality of available colors. An image sensor directed at the ground surface and mounted on the vehicle is configured to capture colored images. A controller is configured to (A) construct one of the content-bearing images as an image representation with an illumination region to be projected onto the ground, (B) analyze a first colored image of the ground surface with the light source deactivated to identify a dominant surface color, (C) select a complementary color relative to the dominant surface color, (D) colorize the illumination region using the selected complementary color, and (E) command the puddle light projector unit to project the image representation using the colorized illumination region.

DETAILED DESCRIPTION OF PREFERRED EMBODIMENTS

The present invention may initially characterize a ground surface color onto which the puddle light image(s) will be projected before the puddle light is activated. Modern vehicles are often equipped with one or more 360-degree exterior image sensors (e.g., side cameras) which are capable of performing (or can provide pixel data to support) color analysis. Thus, a capacity to verify legibility of projected images can be obtained with zero or only a small additional cost. Using an initial image captured of the surface, a dominant color analysis can be performed to determine which color is predominant in the relevant ground surface. For example, a fast Fourier transform (FFT) or other method can be used to analyze an image to determine the dominant surface color. In response to the dominant surface color, the invention may adaptively select a foreground color(s) that provide the best contrast against the prevailing surface colors. The selection may be based upon predetermined color pairings, for example. In some embodiments, a quick iterative calibration routine may be used wherein one or more small images and/or characters are projected using potential color selections and are imaged by the camera. Depending on camera and projection capabilities, multiple color combinations may be evaluated at the same time. The effectiveness of the different colors are compared, and the color scheme most appropriate is selected for presentation of the content-bearing images. The best performing schemes can be further tweaked in subsequent trials to improve results. Thus, clear and readable puddle light messaging is achieved under a wide variety of conditions which enhances a vehicle ownership experience and makes the puddle light system more useful and reliable.

In some embodiments, the camera may be used to recheck the projected images in order to ensure the rendered quality and sharpness remains adequate. The foregoing operations may be conducted separately for different projectors around a vehicle because the ground surface may differ at different locations (e.g., due to parking near yellow lane marker, or having snow on one side while the surface is clear on the other side). In particular, each vehicle onboard side camera may perform its own surface color analysis for a respective puddle light projector directing a respective content-bearing image to a respective part of the ground surface.

In some instances, the properties of a ground surface (e.g., cross hatching of various colors or textures) may result in low contrast images regardless of the selected color(s). In that case, if the vehicle has autonomous driving functionality then it could reposition itself to a location where a better image quality can be obtained.

Figure 1:
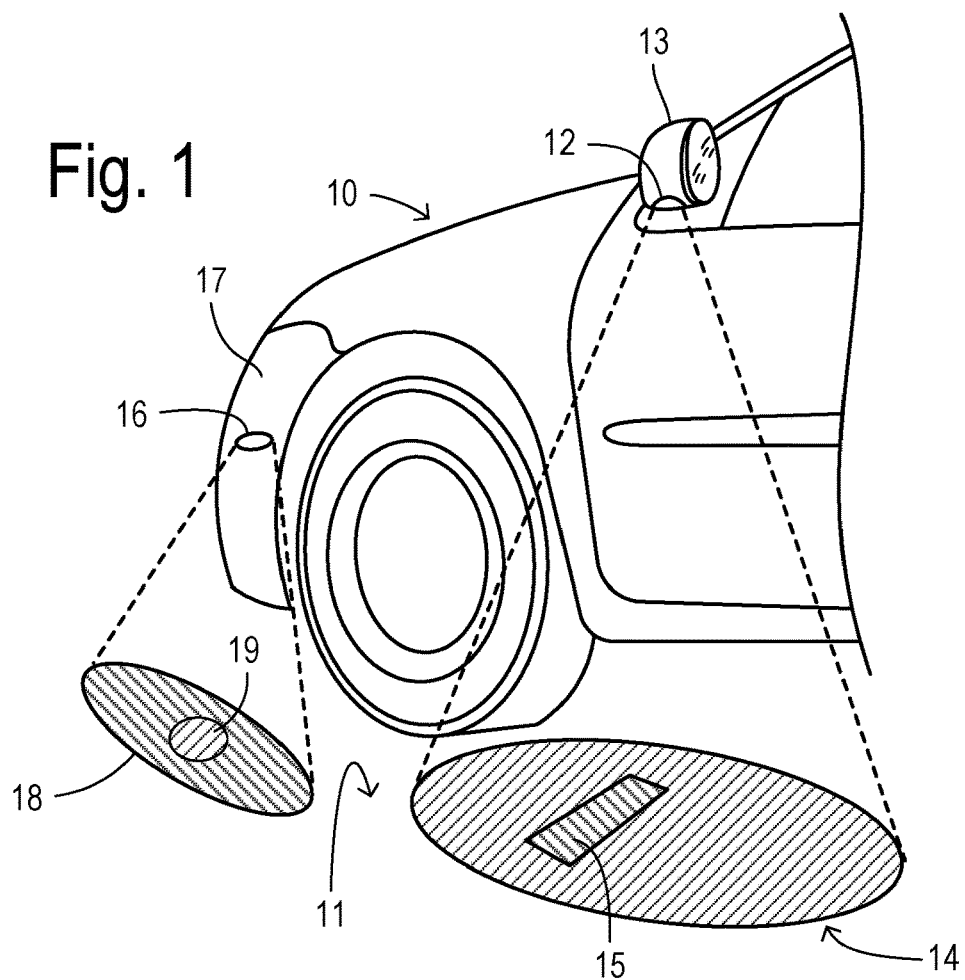
FIG. 1 is a schematic diagram showing a vehicle with puddle lights projecting content-bearing images.

Referring to FIG. 1, a vehicle 10 is stationary (e.g., parked) on a ground surface 11. A puddle light projector unit 12 is mounted in a sideview mirror assembly 13 in order to project a content-bearing image 14 on ground surface 11. Image 14 may include one or more illumination regions which can be projected using at least one selected color from a plurality of available colors. For example, an illumination region 15 may depict a graphic design, logo, information graphic, or text using a selected foreground color. A background region around the foreground illumination region may be unilluminated by unit 12 or can be illuminated with a different color. Projector unit 12 may include a multi-color LED array, colored filters, reflectors, and/or lenses to generate desired images as known in the art. The content for inclusion in the images may be predetermined (e.g., a fixed logo) or may be constructed using vehicle electronic systems which gather vehicle status or events for which corresponding messages or alerts are to be conveyed. Additional puddle light projector units for projecting the same or different content-bearing messages at other positions around vehicle 10 may be provided, such as an LED projector unit 16 on a vehicle trim panel 17 for projecting an illumination region 19 in an imaging/camera-monitoring area 18.

Figure 2:
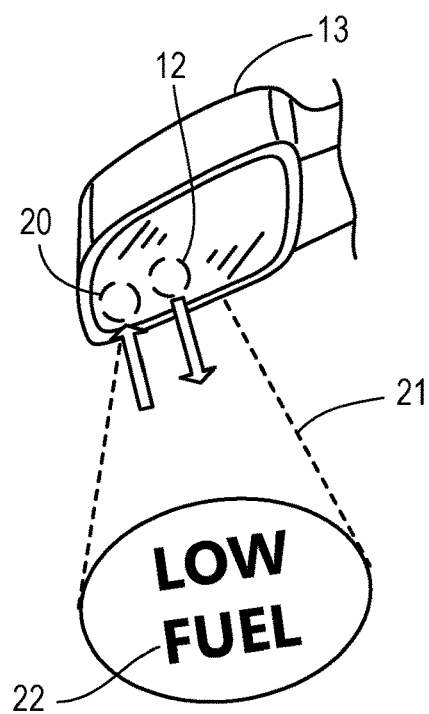
FIG. 2 is a schematic view of a sideview mirror projecting a colored textual image onto a ground surface and containing an image sensor for characterizing the apparent contrast of the projected image.

FIG. 2 shows a sideview mirror 13 which houses both light projector unit 12 and an image sensor 20. Projector unit 12 is capable of emitting images over a footprint 21. Any particular content-bearing image such as a fuel warning message 22 may occupy any portion of footprint 21. Image sensor 20 may be comprised of a digital camera (e.g., using a CMOS image array) with a field of view encompassing footprint 21 so that multiple images can be captured corresponding to the ground surface, e.g., a first image taken in ambient light and a second image under illumination from projector unit 12.

Figure 3:
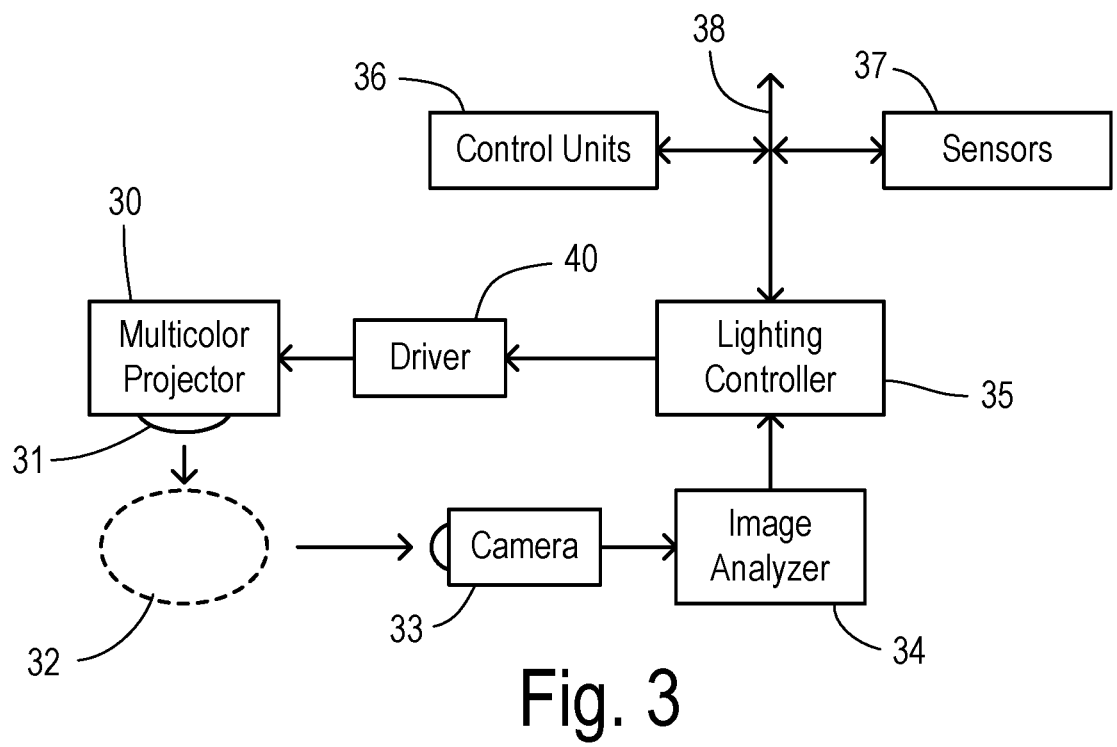
FIG. 3 is a block diagram showing a puddle light system according to one embodiment of the invention.

FIG. 3 shows a vehicle electronic system according to one embodiment of the invention wherein a multicolor puddle light projector 30 with a focusing lens 31 projects content-bearing images onto a ground surface 32. A camera 33 mounted on the vehicle is configured to capture color images directed at ground surface 32. Captured images are provided to an image analyzer 34, and analysis of the images is provided to a lighting controller 35. Image analyzer 34 (which may be incorporated into camera 33 or controller 35, or may be a standalone component) may be configured to extract certain image pixels or pixel regions for analysis, to perform spectral analysis for identifying colors in images, to convert colored images to grayscale images, and/or to quantify image contrast across pixel regions, for example.

Lighting controller 35 may store predetermined content-bearing images (e.g., graphic designs such as logos) to be projected as puddle lights during respective scenarios (e.g., after receiving a remote unlock command from a portable key fob). For content-bearing images conveying dynamic information (e.g., informational graphics or textual descriptions for vehicle parameters), lighting controller 35 may be coupled to various other vehicle control units 36 and/or sensors 37 via a vehicle communication bus 38 (e.g., a CAN bus). Based on a selected content-bearing image and at least one selected complementary color, lighting controller 35 uses the selected complementary color to colorize at least some of the image and then generates appropriate commands to activate projector 30. In particular, lighting controller 35 is coupled to an image driver 40 which processes the colorized image in order to generate electrical signals in a proper format to activate projector 30 according to the colorized image.

Figure 4:
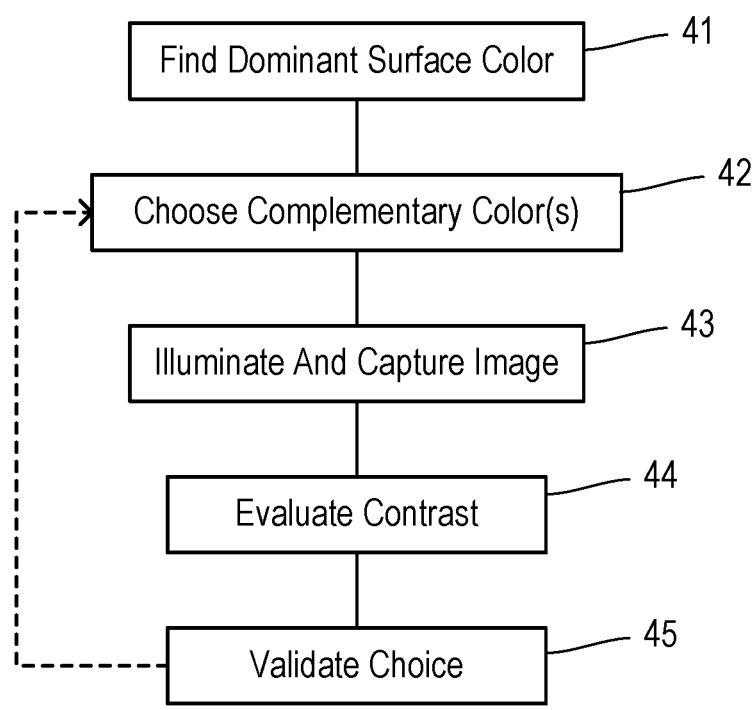
FIG. 4 is a flowchart showing one embodiment of a method of the invention.

According to a first embodiment, the selection of a complementary color is accomplished using a method as shown in FIG. 4. In step 41, a dominant surface color of the ground surface is found. For example, an image sensor may capture an image of the ground surface using ambient light. In daylight or under artificial illumination from a streetlight, a natural color dominating the surface can be identified using spectral analysis. Based on the identified dominant surface color, a complementary color may be selected according to known (i.e., predetermined) pairings of colors (e.g., based on various color wheels as known in the art). For example, yellow may be selected as complementary to a red background, and blue may be selected as complementary to a green background. At dusk or nighttime, the surface may appear black or dark gray (for which a complementary color selection may be white). In step 43, the complementary color chosen in step 42 may be projected onto the ground surface for a foreground or other illumination region of a content-bearing image while an image of the ground surface is captured. In step 44, an image contrast exhibited by the projected image on the ground surface is evaluated. In step 45, the selection of a complementary color is either validated or not based on the image contrast. For example, if the image contrast is above a threshold, then the color choice is validated and the method ends. If image contrast is below the threshold, then a return is made to step 42 to select a different complementary color and the method proceeds to attempt to validate the new choice.

Image contrast analysis of the type used in step 44 may determine an image contrast parameter based on one or more images of the ground surface including a projected image which is taken by a side camera installed on the vehicle. In a process for quantifying an image contrast parameter, image pixels (in an area of the captured image including the projected image illuminated by the selected complementary color and a surrounding background area) are converted a grayscale values. Any of several known grayscale conversion schemes can be used. The grayscale conversion may generally correspond to an overall intensity taking into account human vision response. For efficient processing, the grayscale pixels may be binned into several ranges to generate a smaller number of grayscale values as a histogram, e.g., integer values from 0 to a maximum value, with a value of 0 representing the darkest pixels and the maximum value representing the brightest pixels. A lower maximum value (e.g., 5) reduces the overall processing workload because of the reduced number of bins while a higher maximum value (e.g., 32) provides higher resolution and accuracy. A dispersion or distribution of the pixel grayscale values across the bins determines an image intensity parameter. A wider dispersion of grayscale values corresponds to a greater image contrast.

Figure 7:
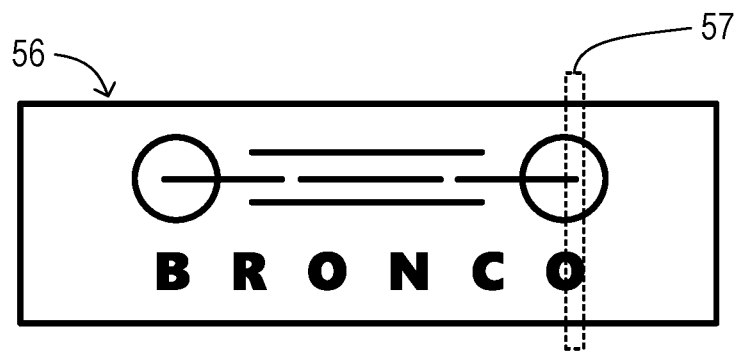
FIG. 7 shows a projected image and a subsection of the image selected for quantifying an image contrast.
Figure 5:
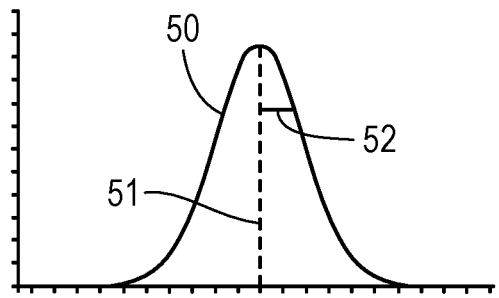
FIGS. 5 and 6 are graphs depicting standard deviation values for respective sets of grayscale pixel values for images having a lesser and a greater image contrast, respectively.
Figure 6:
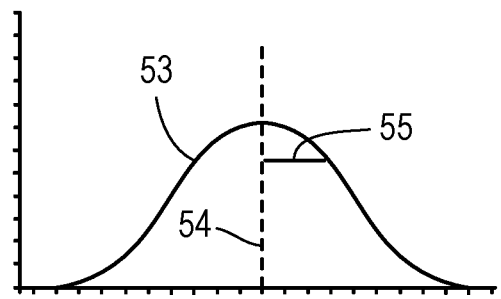

The dispersion may be calculated as a standard deviation according to the pixel count of pixels binned into each grayscale value. FIG. 6 shows a plot of grayscale intensity values (e.g., not binned into ranges) wherein a curve 50 has a mean value 51, and FIG. 7 shows a similar plot wherein a curve 53 has a mean value 54. While mean values 51 and 54 are the same, different dispersions of the grayscale values result in different standard deviation values 52 and 55, respectively, which reflect the greater contrast in the pixels represented in FIG. 6. Standard deviation values for data sets can be calculated using known routines.

Figure 8:
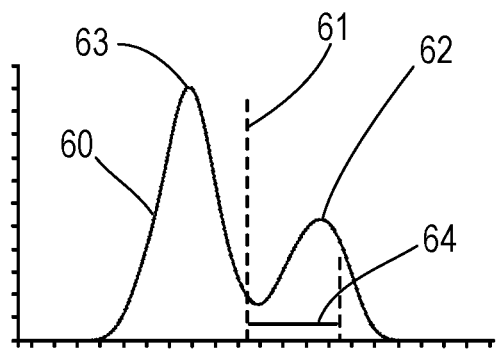
FIG. 8 is a graph depicting a standard deviation value for grayscale pixel values in the selected subsection of the captured image of FIG. 7.

For statistical purposes in analyzing contrast in a bi-colored image, a calculation of a standard deviation (or other distribution) may be conducted using a selected subsection of the captured image. The subsection may preferably include significant portions (e.g., approximately equal areas) of the intended foreground and background. In particular, the selected subsection includes a plurality of image pixels with respective color values. Based on the details of a content-bearing image to be projected, a predetermined proportion of areas inside and outside an illuminated region having the selected complementary color can be included within the subsection of the captured image. For example, FIG. 7 shows a content-bearing image 56 as a graphic design or logo. A subsection 57 is overlaid on a captured image which is taken while image 56 is projected on the ground surface, such that subsection 57 includes both foreground portions (illuminated with the selected or potential complementary color) and a surrounding background. When good contrast exists, a plot of grayscale values for pixels within subsection 57 may result as shown in FIG. 8 wherein a curve 60 has a mean value 61. Curve 60 may have peaks 62 and 63 corresponding to the foreground and background areas. A standard deviation 64 from mean value 61 provides the image contrast parameter to quantify the visibility of the projected image.

In selecting a best color combination, a dispersion of grayscale values which is shaped like curve 60 is desirable. A bi-modal separation of peaks 62 and 63 along the X-axis reflects a good image contrast (and corresponds with higher values of the standard deviation). The height of one of the peaks may be higher than the other along the Y-axis due to differences in the relative image areas of the foreground and background-colored regions. This difference may tend to slightly reduce the value of the standard deviation but can be limited by analyzing an image subsection with foreground and background areas that are approximately equal. As an alternative to the standard deviation, the "peakiness" of the histogram can be estimated using a kurtosis calculation.

In some embodiments, an initial selection of a complementary color based on analyzing a first colored image of the ground surface with the light source deactivated to identify the dominant surface color may be used to nominally project a full content-bearing image. Thus, activation of the puddle lighting feature can be initiated in a least amount of time. Once the puddle lighting is activated, validity of the initial selection can be validated and changed in the event that an insufficient image contrast parameter is present (e.g., when a standard deviation is calculated which is less than a threshold). The threshold may be comprised of a predetermined standard deviation value. Alternate choices for the complementary color can be cycled and the respective image contrast parameters computed. Cycling may be terminated once an image contrast parameter greater than or equal to the threshold is obtained, or the cycling can proceed through all good candidate foreground colors and the foreground/background color combination that produces the highest intensity parameter can be chosen.

Figure 9:
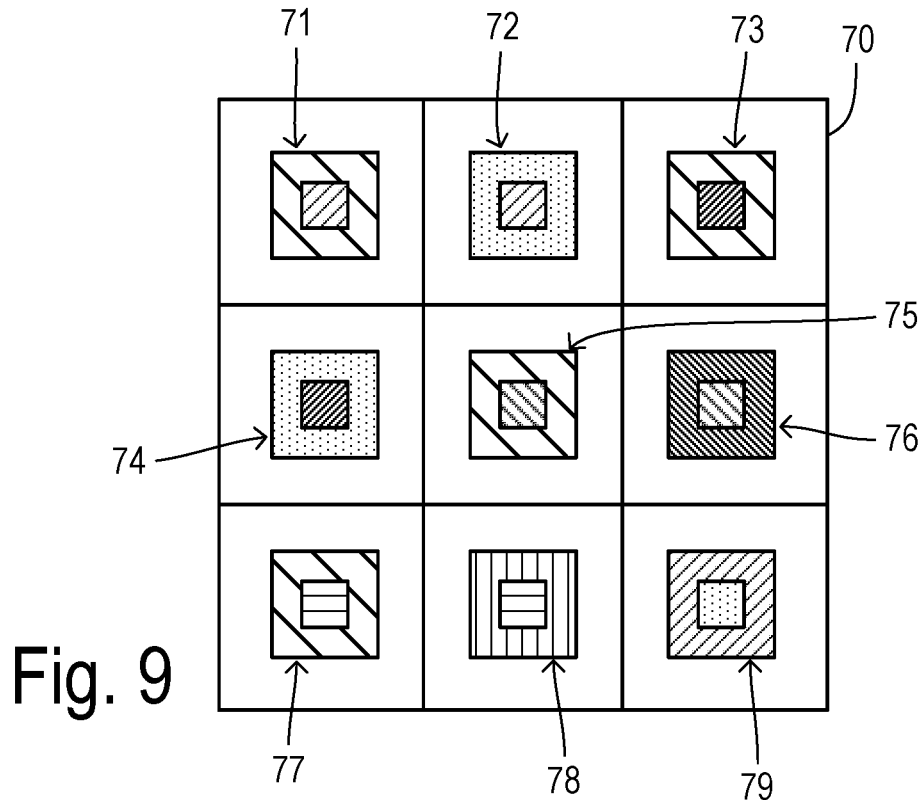
FIG. 9 shows a test image for projection onto a ground surface in order to quickly ascertain an optimal color selection for generating a content-bearing image in view of the optical properties of the ground surface.

Potentially more robust procedures to select a complementary color can also be used which may result in short delays and which may rely on potentially noticeable transient images. For example, a test image 70 as shown in FIG. 9 can be projected onto the ground surface including an array of color patches 71-79 representing a group of most likely color combinations. For example, each patch may comprise a center square and an outer frame, wherein the center square projects a potential complementary color selection for the illumination region and the outer frame may project no light (so that the frame reveals the ground surface in ambient light) or a contrasting background color. A single camera image may be captured with test image 70 being projected on the ground surface so that analysis of the camera image is able to quickly ascertain an optimal color selection for generating a content-bearing image in view of the optical properties of the ground surface. The center square and outer frame of each patch 71-79 may preferably have the same respective area in order to best quantify the respective image contrast parameters. After quantifying a respective image contrast parameter for the image area of each respective patch, one of the available colors is selected for the illumination region according to the relative magnitudes of the respective image contrast parameters. Where a particular vehicle has multiple puddle light projector units illuminating different parts of the ground surface, the selection procedures may be conducted separately for each. Thus, it is possible for one puddle light on one side of the vehicle to have a white/black combination while the puddle light on the other side of the vehicle has a yellow/black combination.

Figure 10:
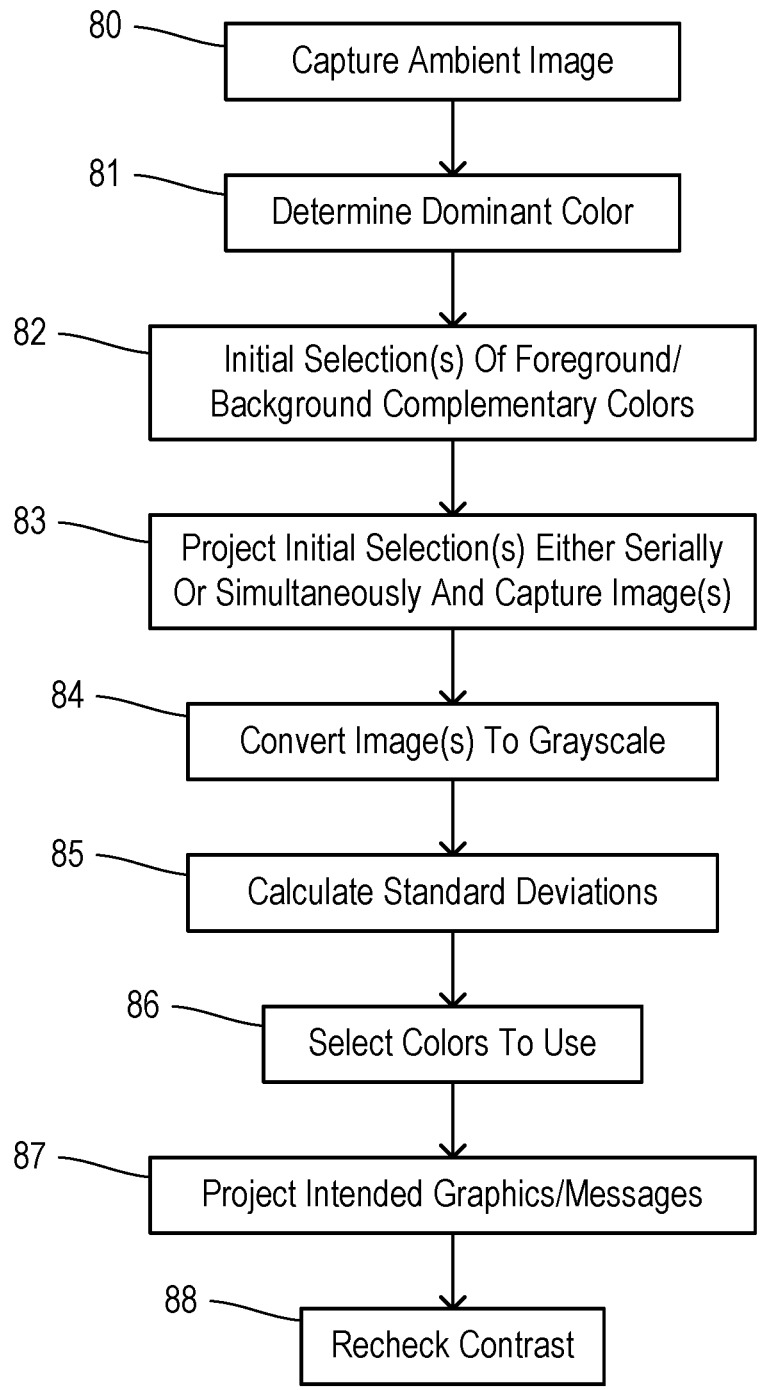
FIG. 10 is a flowchart showing another embodiment of a method of the invention.

Another embodiment of a preferred method of the invention is shown in FIG. 10. The method may be invoked when an action such as a remote unlock command from a user is received and a welcome function is initiated to assist the user as they approach the vehicle. A content-bearing image may be constructed (e.g., as test data, graphic data, or graphic designs) by one or more controllers in the vehicle depending upon how the activation of the puddle lights is invoked. In step 80, an ambient light image of the ground surface to be illuminated by the puddle light system is captured by a camera or other image sensor on the vehicle. In step 81, a dominant color exhibited by the ambient light image is determined (e.g., by analyzing a color spectrum of the image pixels corresponding to the portion of the ground surface to receive the puddle light projected images). An initial selection of a complementary color with respect to the dominant ground surface color is made in step 82. For example, the dominant color may be used as an index into a color mapping which lists one or more potential colors that are likely to provide good contrast is juxtaposition with the ground coloration.

In step 83, an initial selection is used to colorize the desired content-bearing image and it is projected onto the ground surface while the camera or image sensor captures a resulting image. When multiple initial selections are available, they may be used to re-colorize the content-bearing image either serially or simultaneously (in an array of smaller image patches) with corresponding camera images being captured.

To analyze the image contrast of the colorized image(s), the captured camera image(s) are converted to grayscale values in step 84. In step 85, the grayscale values are used to calculate values for the standard deviation (or other metric of the dispersion of the grayscale values). Based on the relative calculated values for the standard deviation, optimal color selection(s) are made in step 86. The selections may be comprised of selecting only a foreground color to be projected against an unilluminated adjacent ground surface or may be comprised of selections for both a foreground color and a background color.

In step 87, the intended graphics and/or text messages of the content-bearing image are projected by the puddle light projector unit(s) using the selected complementary color(s). In step 88, the actual contrast parameter for the projected image(s) is calculated and/or periodically recalculated in order to ensure that a best available image contrast to achieved.

What is claimed is:

1. A puddle light system projecting content-bearing images onto a ground surface adjacent a vehicle, comprising:
    a puddle light projector unit mounted on the vehicle and comprising a multicolor light source configured to project the content-bearing images using at least one selected color from a plurality of available colors;
    an image sensor mounted on the vehicle configured to capture colored images directed at the ground surface;
    a controller configured to (A) construct one of the content-bearing images as an image representation with an illumination region to be projected onto the ground surface, (B) analyze a first colored image of the ground surface with the light source deactivated to identify a dominant surface color, (C) select a complementary color relative to the dominant surface color, (D) colorize the illumination region using the selected complementary color, (E) command the puddle light projector unit to project the image representation using the colorized illumination region, (F) analyze a second colored image captured with the light source activated using the selected complementary color to quantify an image contrast parameter, and (G) alter the selection of the complementary color when the image contrast parameter is less than a threshold.

2. The puddle light system of claim 1 wherein a selected subsection of the second colored image is analyzed which includes a predetermined proportion of areas inside and outside the illuminated region having the selected complementary color.

3. The puddle light system of claim 2:
    wherein the selected subsection includes a plurality of image pixels with respective color values;
    wherein the controller is configured to quantify the image contrast parameter by (iii) converting the color values to respective grayscale values for each of the image pixels, and (iv) determining a dispersion of the respective grayscale values.

4. The puddle light system of claim 3 wherein the dispersion is comprised of a standard deviation, and wherein the threshold is comprised of a predetermined standard deviation value.

5. The puddle light system of claim 1 wherein the illumination region generates the content-bearing images as textual information.

6. The puddle light system of claim 1 wherein the illumination region generates the content-bearing images as a graphic design.

7. A method of projecting content-bearing images onto a ground surface adjacent a vehicle using a multicolor light source configured to project the content-bearing images using at least one selected color from a plurality of available colors, the method comprising the steps of:
    capturing a first colored image using an image sensor mounted on the vehicle and directed at the ground surface;
    analyzing the first colored image of the ground surface with the light source deactivated to identify a dominant surface color;
    selecting a complementary color relative to the dominant surface color;
    capturing a second colored image with the light source activated using the selected complementary color;
    analyzing the second colored image to quantify an image contrast parameter; and
    altering the selection of the complementary color when the image contrast parameter is less than a threshold;
    constructing one of the content-bearing images as an image representation with an illumination region to be projected onto the ground surface;
    colorizing the illumination region using the selected complementary color; and
    projecting the image representation using the colorized illumination region.

8. The method of claim 7 wherein a selected subsection of the second colored image is analyzed which includes a predetermined proportion of areas inside and outside the illuminated region having the selected complementary color.

9. The method of claim 8 wherein the selected subsection includes a plurality of image pixels with respective color values, and wherein the step of quantifying the image contrast parameter is comprised of:
    converting the color values to respective grayscale values for each of the image pixels; and
    determining a dispersion of the respective grayscale values.

10. The method of claim 9 wherein the dispersion is comprised of a standard deviation, and wherein the threshold is comprised of a predetermined standard deviation value.

11. The method of claim 7 wherein:
    the second colored image is projected with a selected subset of the available colors each occupying a respective image area;
    a respective image contrast parameter is quantified for each respective image area; and
    the step of altering the selection of the complementary color is comprised of selecting one of the available colors according to the relative magnitudes of the respective image contrast parameters.

12. The method of claim 11 wherein the step of quantifying the respective image contrast parameters is comprised of:
    converting color values of image pixels within the second colored image to respective grayscale values for each of the image pixels; and
    determining a respective dispersion of the respective grayscale values corresponding to each respective image area.

13. The method of claim 12 wherein each respective dispersion is comprised of a respective standard deviation, and wherein the one of the available colors which is selected corresponds to a greatest one of the standard deviations.

14. A puddle light system projecting content-bearing images onto a ground surface adjacent a vehicle, comprising:
    a puddle light projector unit mounted on the vehicle and comprising a multicolor light source configured to project the content-bearing images using at least one selected color from a plurality of available colors;

an image sensor mounted on the vehicle configured to capture colored images directed at the ground surface;

a controller configured to (A) construct one of the content-bearing images as an image representation with an illumination region to be projected onto the ground surface, (B) analyze a first colored image of the ground surface with the light source deactivated to identify a dominant surface color, (C) analyze a second colored image captured with the light source activated to project a selected subset of the available colors each occupying a respective image area, (D) quantify a respective image contrast parameter for each respective image area, (E) select one of the available colors according to the relative magnitudes of the respective image contrast parameters as a complementary color relative to the dominant surface color, (F) colorize the illumination region using the selected complementary color, and (G) command the puddle light projector unit to project the image representation using the colorized illumination region.

15. The puddle light system of claim 14 wherein the controller is configured to quantify the respective image contrast parameters by converting color values of image pixels within the second colored image to respective grayscale values for each of the image pixels, and determining a respective dispersion of the respective grayscale values corresponding to each respective image area.

16. The puddle light system of claim 15 wherein each respective dispersion is comprised of a respective standard deviation, and wherein the one of the available colors which is selected corresponds to a greatest one of the standard deviations.

* * * * *